United States Patent [19]

Crotti

[11] Patent Number: 4,695,102
[45] Date of Patent: Sep. 22, 1987

[54] LUBRICATED ROLLER FOR THE TRACKS OF CRAWLER VEHICLES, IN PARTICULAR, A TOP ROLLER WITH FIXED OVERHUNG SHAFT AND ROLLING BEARINGS

[75] Inventor: Aldo Crotti, Modena, Italy

[73] Assignee: Societa' Italtractor Meccanica Itm S.p.A., Potenza, Italy

[21] Appl. No.: 801,854

[22] Filed: Nov. 26, 1985

[30] Foreign Application Priority Data

Nov. 30, 1984 [IT] Italy ............................. 29049/84[U]

[51] Int. Cl.$^4$ .......................................... B62D 55/14
[52] U.S. Cl. ...................................... 305/11; 305/14; 305/28; 384/517
[58] Field of Search .............. 301/63 DD; 305/11, 14, 305/21, 28, 25; 384/517, 539, 600

[56] References Cited

U.S. PATENT DOCUMENTS

| | | | |
|---|---|---|---|
| 2,915,326 | 12/1959 | Mason | 305/14 X |
| 2,926,968 | 3/1960 | Toth | 305/14 X |
| 3,804,562 | 4/1974 | Hansson | 384/517 X |

FOREIGN PATENT DOCUMENTS

| | | | |
|---|---|---|---|
| 655391 | 1/1963 | Canada | 305/28 |
| 58-196320 | 11/1983 | Japan | 384/517 |
| 727509 | 4/1980 | U.S.S.R. | 305/14 |

Primary Examiner—David A. Scherbel
Attorney, Agent, or Firm—Browdy and Neimark

[57] ABSTRACT

The roller has a fixed overhung shaft (2) with a groove at its overhung end, in which to lodge a snap ring (14), and a shoulder (9) at its anchored end. The roller body (1) is journalled to the shaft (2) via a pair of rolling bearings (4) the inner rings (6) of which are checked axially by the snap ring (14) and the shoulder (9), respectively. An annular bracket (20) shrouds a seal (17) having a frontal lip which rides the bearing (4) nearest the anchored end of the shaft (2); the bracket (20) itself is locked to the shaft in fluid-tight fashion. An outer cover (15) pressed into the outer edge of the hollow body of the roller encases the overhung end of the shaft (2). The roller thus embodied is simple and inexpensive to manufacture.

14 Claims, 2 Drawing Figures

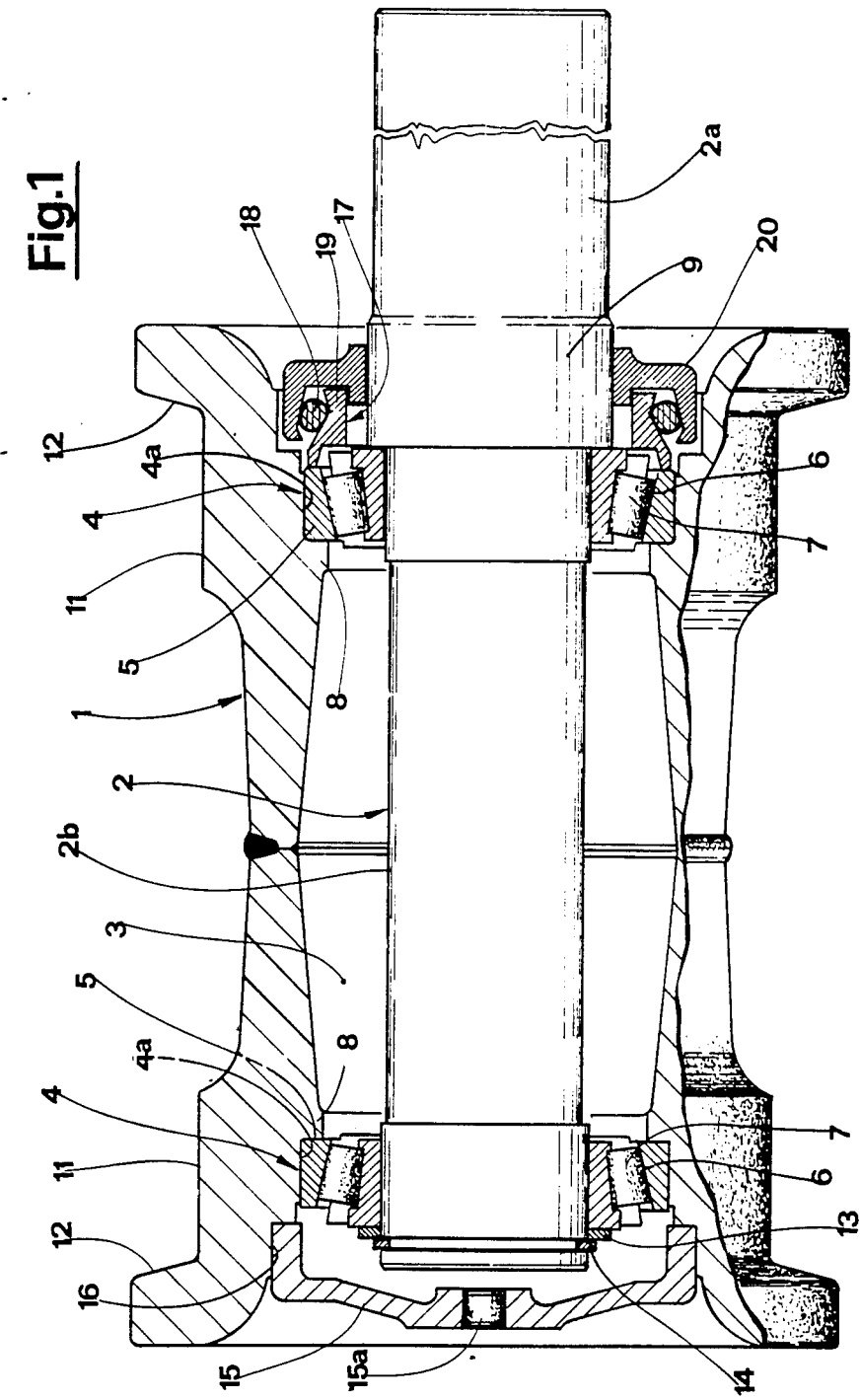

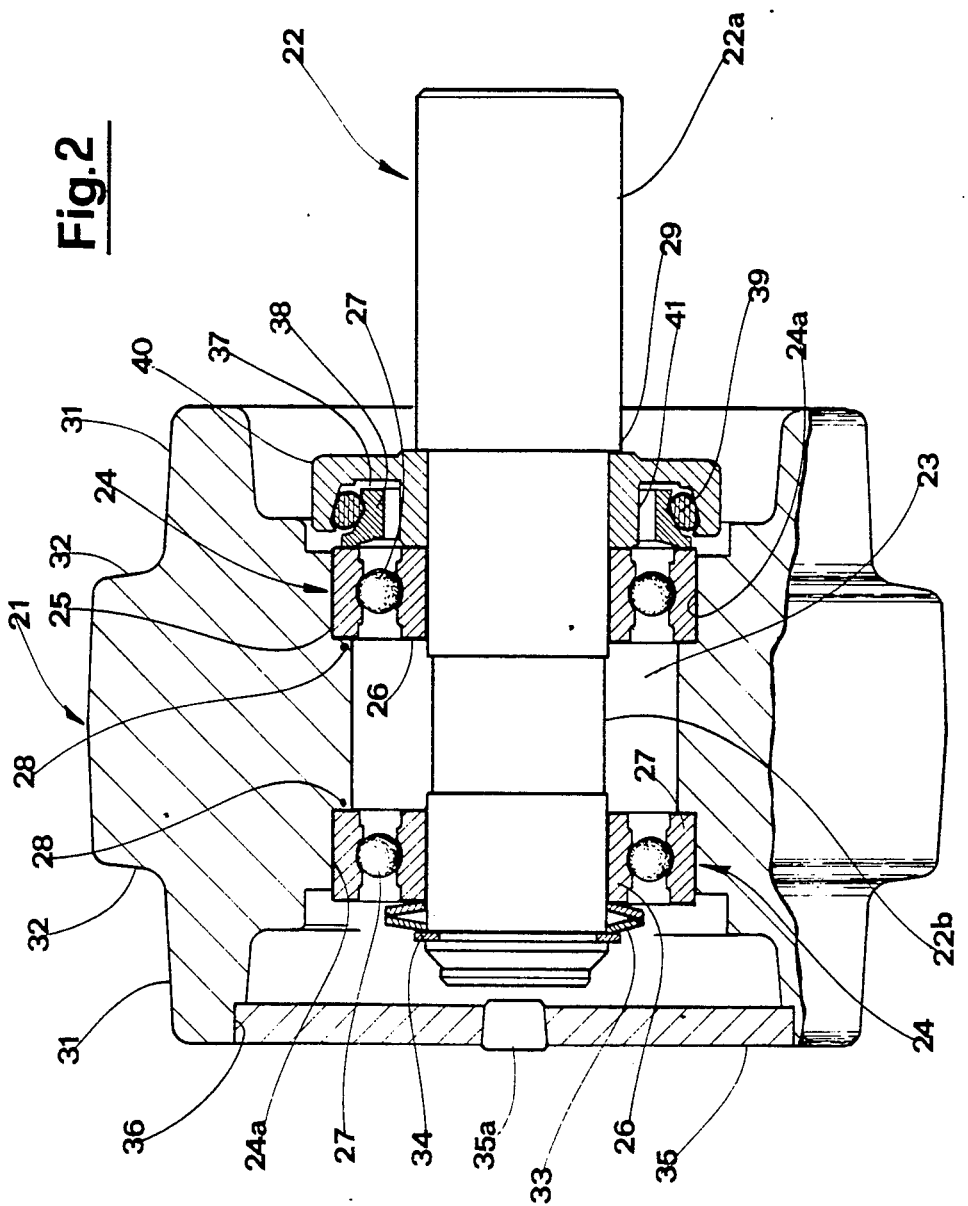

LUBRICATED ROLLER FOR THE TRACKS OF CRAWLER VEHICLES, IN PARTICULAR, A TOP ROLLER WITH FIXED OVERHUNG SHAFT AND ROLLING BEARINGS

BACKGROUND OF THE INVENTION

The invention disclosed relates to lubricated rollers of the type featuring a fixed overhung shaft and rolling bearings, and particular, the top rollers of crawler tracks.

The prior art embraces top rollers for the tracks of crawler tractors or other crawler vehicles, comprising a shaft which is mounted to the vehicle in overhung fashion and which carries a roller body that turns idle around the shaft. The roller body is heat-treated steel and exhibits specially machined cylindrical surfaces over which the track is made to pass; such surfaces are bordered by peripheral rims that keep the track properly aligned.

The body of the roller is entirely hollow, and creates an internal chamber in which a permanent supply of lubricant is contained.

Rotation of the body in relation to the shaft is obtained by locating a pair of rolling bearings in between the two; these may be either roller or ball type, designed to withstand radial and thrust loads alike, and are lodged in seats created in the bore of the roller for this very purpose. The outer ring of each bearing is pressed into a respective seat, and thus remains integral with the roller body; axial retaining, or limiting means, namely, shoulders incorporated into the surface of the roller bore, prevent the bearing from shifting axially toward the center of the roller.

Further, external axial limiting means integral with the shaft are provided for the purpose of preventing the bearings from drifting axially away from the center of the roller.

The bearings are therefore retained axially between the radial shoulders of the roller body and the external limiting means, and the roller itself is locked axially between the bearings.

The chamber containing the lubricant is a complete enclosure, bounded at the overhung end by a cover, bolted to the roller body in conjunction with seals; in some prior art embodiments this outer cover also functions as an external bearing retainer.

At the end of the shaft which is anchored, the lubricant chamber is enclosed by a special seal located between the relative bearing and an annular bracket which exhibits a C- or L-shaped section and is locked to the shaft by pins or other means.

SUMMARY OF THE INVENTION

The invention, as disclosed and defined in the appended claims, sets out to improve on rollers of the general type briefly described, with the end in view of making the manufacturing process simpler, and less costly.

The shaft is simple to manufacture, according to the invention, being worked from cylindrical stock so as to produce no more than a single shoulder (or- a groove) near to its mounted end, a snap ring groove near to the overhung end, and seats for the bearings which are separated by an intermediate stretch of marginally smaller diameter.

The invention envisages no external machining operations on the body of the roller, and surfaces of the axial bore requiring finishing operations are the bearing seats and the seat of the outer cover only; economy of production is thus clearly achieved.

The outer cover of the lubricant chamber can be extruded from sheet metal, or simply embodied as a flat circular plate pressed into the roller body—i.e. simple to manufacture and requiring no bolts.

Where a distance collar is fitted to either bearing, this can be fashioned with extreme facility from thin rod bent over to form a circle, and as such is markedly inexpensive to produce.

No special or complicated means are required by which to compensate for axial machining tolerances of the various components or pre-load the bearings, since belleville springs can be used, if necessary.

The annular bracket can be manufactured in extruded sheet metal or aluminum, or molded plastic, at singularly low cost. The joint between the bracket and shaft also serves as a seal, preventing egress of lubricant from between the fitted surfaces of the two; sealing rings are thus avoided, as are the special seats that would have to be provided for them either in the shaft or in the body of the roller.

BRIEF DESCRIPTION OF THE DRAWINGS

Two embodiments of the invention will now be described in detail by way of example, with the aid of the accompanying drawings, in which:

FIG. 1 is the axial section through a first embodiment of the improved roller; and FIG. 2 is the axial section through a second embodiment of the improved roller.

DESCRIPTION OF THE PREFERRED EMBODIMENTS

With reference to the embodiment illustrated in FIG. 1, the improved roller comprises a body 1 that is paired in rolling contact with a shaft 2.

The body 1 consists of two symmetrical steel pressings matched together, welded through the central transverse plane which establishes such symmetry, and then heat-treated. The side areas of the roller body 1 are provided with special cylindrical races 11 on which the crawler track links may roll, and the races 11 in their turn are bordered on the outside by relative peripheral rims 12 that serve to keep the track aligned on the roller.

The bore of the body 1 creates a cavity 3 that passes through the roller axially from side to side, surrounding the shaft 2 and encasing its overhung end.

Once the pressings are welded and hardened, no further manufacture operation need by carried out on the external surface of the body 1. As far as the internal surface is concerned, finishing passes are required to produce seats 4a for the bearings 4, and a further seat 16 for the outer cover 15.

A pair of taper roller bearings 4 is located between the body 1 of the roller and the shaft, able to withstand both radial and thrust loads. The outer ring, or cut 5 of each bearing is either pressed or fixed with adhesive into the relative seat 4a offered by the surface of the bore cavity 3 near to its outer edge, and thus remains integral with the body 1. The cup 5 of each bearing is checked axially by internal limiting means in the shape of a corresponding shoulder 8 issuing from the axial bore cavity 3.

The inner ring, or cone 6 of the single taper roller bearing fits positively over the shaft 2, and is prevented from drifting axially outward, away from the center of the roller, by one of a pair of external limiting means; more exactly, one such external limit takes the shape of a shoulder 9 incorporated into the shaft 2 at that end which is made fast to the vehicle, whereas the remaining external limit is embodied as a snap ring 14, located in a groove provided in the shaft at its overhung end.

In practice the snap ring 14 can be fashioned to advantage from a length of thin stock bent around into circular shape. 13 denotes a thrust washer which is located between the snap ring 14 and the relative bearing cone 6; this too can be made cheaply by bending thin stock into the appropriate circular shape.

The relative axial positions of the cup and cone of each being 4 are dictated by the rollers 7 located between them, since these inhibit movement of the cone 6 and of the cup 5 toward and away from the center of the roller 1, respectively.

It follows that the roller body 1 is retained in axial position by the bearings 4, whilst these in their turn are retained axially by the two external limiting means 9 and 14 integral with the shaft 2.

The shaft 2 comprises an end section 2a that is fixed immovably to the chassis of the crawler vehicle; this end section 2a joins with a stretch 2b of marginally reduced diameter, thereby embodying the shoulder 9. The ends of this narrower stretch 2b are turned so as to produce seats for the cones 6 of the two respective bearings, and the diameter of the intermediate section between the seats can be reduced still further such that fitment of the bearings will not be hindered.

The space 3 remaining between the surface of the bore and the surface of the stretch 2b of shaft 2 passing through the roller creates a substantially annular chamber in which lubricant is contained for the two bearings 4, which offer a generous surface area to the chamber in order to remain constantly lubricated.

The end of the chamber encasing the overhung end of the shaft 2 is enclosed by a circular cover 15 that can either be pressed into the roller body 1 or fixed thereto with adhesive; to this end, the body 1 offers a cylindrical seat 16 incorporated into the outer edge of the surface of the bore cavity 3. The circular cover 15 will be observed in section to have its circumferential edge bent through into the axial direction toward the inside of the chamber, a contour easily produced by the extrusion of sheet metal.

The remaining end of the lubricant chamber is enclosed by a seal assembly 17 seated between the relative bearing and an annular bracket 20. The seal 17 produces a frontal action and comprises a metal lip 19 that rides on the radial surface of the bearing cup 5, and a thrust ring 18 which urges axially against the lip 19. The annular bracket exhibits an L-profile when viewed in section, and urges against the seal assembly 17, which in turn urges against the bearing 4.

The annular bracket 20 is provided with a central bore by way of which it is either pressed or fixed with adhesive onto the end section 2a of the shaft 2, such that the fitted surfaces of bore and shaft are fluid-tight. Egress of lubricant is thus prevented both by the seal assembly 17 and by the fit between the bracket 20 and the shaft 2, a fit which also serves to render the bracket integral with the shaft. The shape of the bracket 20 is markedly simple and can be produced either in extruded sheet metal, or aluminum alloy, or molded plastic.

The outer cover 15 has a threaded hole and a plug 15a; the hole serves both for the introduction of lubricant, and as an anchor point into which conventional threaded means may be screwed for the purpose of pulling the cover 15 from its seat.

FIG. 2 illustrates the embodiment of a typical model of top roller used to support tracks of lighter weight than those for which the roller of FIG. 1 would be employed.

The roller comprises a body 21 that is paired in rolling contact with a shaft 22; the body 21 is a single steel pressing. The side areas of the body 21 have cylindrical races 31 on which the crawler track links may roll, and the races 31 are bordered on the inside by relative peripheral shoulders 32 that serve to keep the track aligned on the roller.

The bore of the body 21 creates a cavity 23 that passes through the roller axially from side to side, surrounding the shaft 22 and encasing its overhung end.

Once the roller pressing has been hardened, no further manufacturing operation need by carried out on the external surface of the body 21. As far as the internal surface is concerned, finishing passes are needed to produce seats 24a for the bearings 24, and a further seat 36 for the outer cover 35.

A pair of ball bearings 4 is located between the body 21 of the roller and the shaft 22, able to withstand radial loads, and to accommodate a certain degree of thrust. The outer ring 25 of each bearing is checked axially by internal limiting means in the shape of a corresponding shoulder 28 issuing from the axial bore cavity 23.

The inner ring 26 of the single bearing fits positively over the shaft 22, and is prevented from drifting axially outward away from the center of the roller by a one of a pair of external limiting means; more exactly, one such external limit takes the shape of a shoulder 29 incorporated into the shaft at that end which is made fast to the vehicle, whilst the remaining external limit is embodied as a snap ring 34, lodged in a groove provided in the shaft at its overhung end.

33 denotes a pair of belleville discs located between the snap ring 34 and the inner ring 26 of the relative bearing, providing flexibly embodied means that preload the bearings 24 and thus compensate for axial machining tolerances of the roller components.

The relative axial positions of the inner and the outer ring of each bearing 24 are dictated by the balls 27 located between them. It follows that the roller body 1 is retained in axial position by the bearings 24, whilst these in their turn are retained axially by the two external limiting means 29 and 34 integral with the shaft 22.

The shaft 22 comprises a section 22a, located at the end which is fixed immovably to the chassis of the crawler vehicle, that joins with a stretch 22b of marginally reduced diameter, thereby embodying the shoulder 29. The ends of the narrower stretch 22b are turned so as to produce seats for the inner rings 26 of the two respective bearings, and the diameter of the intermediate section between the seats can be reduced still further such that fitment of the bearings will not be hindered.

The space 23 remaining between the surface of the bore and the surface of the stretch 22b of shaft 22 passing through the roller creates a chamber in which lubricant is contained for the two bearings 24.

The end of the chamber encasing the overhung end of the shaft 22 is enclosed by a flat circular cover 35 that can either be pressed onto the roller body 21 or fixed thereto with adhesive; to this end, the body 21 offers a cylindrical seat 36 incorporated into the outer edge of the surface of the cavity 23. This circular cover 35 is easily punched from sheet metal.

The remaining end of the lubricant chamber is enclosed by a seal assembly 37 seated between the relative bearing 24 and an annular bracket 40. The seal 37 is of the same type as that illustrated in FIG. 1, and comprises a metal lip 38 that rides on the radial surface of the bearing outer ring 25, backed by a thrust ring 39. The annular bracket 40 exhibits an L-profile when viewed in section and urges against the seal assembly 37, which in turn urges against the bearing 24.

The annular bracket 40 is provided with a central boss 41 by way of which it is either pressed or fixed with adhesive onto the narrow section 22b of the shaft 22, between the shoulder 29 and the inner ring 26 of the relative bearing; the boss 41 thus serves as a distance collar.

The boss 41 is pressed onto the shaft 22, or fixed with adhesive such that the fitted surfaces of boss and shaft are fluid-tight, and the boss itself, hence the bracket, is prevented from rotating relative to the shaft. The shape of the bracket 40 is markedly simple, and obtainable either from extruded sheet metal, or aluminum alloy, or molded plastic.

In a further embodiment, not illustrated in the drawings, the shoulder 9 or 29 is replaced by a second snap ring; in this instance, the shaft 2 or 22 is of cylindrical shape, of constant or substantially constant diameter, and provided with two grooves in which to lodge the first and second snap rings.

What is claimed:

1. A lubricated roller for the tracks of crawler vehicles, in particular a top roller, of the type featuring a fixed overhung shaft and rolling bearings, said roller comprising:

a shaft having an overhung end and an anchored end, a groove located at its overhung end with a first snap ring therein, and external limiting means located at its anchored end;

a roller body carried by the shaft and provided with a bore cavity through which said shaft passes through, said roller body having a pair of shoulders at the ends of said bore cavity;

a pair of rolling bearings located between said shaft and said roller body, the inner ring of a first of said rolling bearings being checked by contact with said external limiting means at said anchored end of said shaft, the inner ring of the other rolling bearing being checked by said snap ring, and the outer rings of said rolling bearings being checked by said shoulders of said roller body;

a frontal-action seal in contact with the outer ring of the respective rolling bearing located at the anchored end of the shaft, to prevent egress of lubricant between said seal and said outer ring;

an annular bracket fitted around the frontal-action seal such as to remain integral with the shaft, and to provide a fluid-tight seal with said shaft and an annular part of said seal; and an outer circular cover enclosing a lubricant chamber at the overhung end of the shaft by being fixed to the body of the roller, said outer circular cover being located in a cylindrical seat in the outer edge of said bore cavity.

2. The roller as in claim 1, wherein the shaft is cylindrical and has a finished surface which, besides for said external limiting means and the snap ring groove, consists of seats for the inner rings of the rolling bearings and an intermediate stretch of marginally reduced diameter between the two seats.

3. The roller as in claim 1, wherein use is made of a thrust ring, located between the first snap ring and the inner ring of the relative bearing, and fashioned from thin stock bent around into the appropriate circular shape.

4. The roller as in claim 1, wherein one or more Belleville discs are located between the snap ring and the inner ring of the respective rolling bearing.

5. The roller as in claim 1, wherein said external limiting means comprises a shoulder on said shaft at said anchored end, and the annular bracket lodges between said shoulder and the inner ring of the respective rolling bearing.

6. The roller as in claim 1 wherein said outer circular cover consists of a flat circular plate.

7. The roller as in claim 1 wherein said outer cover is fashioned from extruded sheet metal.

8. The roller as in claim 1 wherein the annular bracket is of extruded sheet metal.

9. The roller as in claim 1 wherein the outer cover circular is provided with a tapped center hole, normally stopped with a plug, which serves both for the introduction of lubricant and as a point in which to screw means for pulling the cover from the roller body.

10. The roller as in claim 1, comprising a flexible thrust ring between an inner annular part of said annular bracket and an outer annular part of said frontal-action seal, for causing a respective extending part of said frontal-action seal in contact with said outer ring of the respective rolling bearing to bear thereagainst to provide said prevent of egress of said lubricant.

11. The roller as in claim 1, wherein said frontal-action seal is of metal.

12. The roller as in claim 1, wherein said inner annular part of said annular bracket and said outer annular part of said frontal-action seal are sloped to urge said part of said frontal-action seal against said outer ring of the respective rolling bearing.

13. The roller as in claim 1, said annular bracket having an annular boss portion extending under said frontal-action seat, said annular boss portion serving as a distance collar between said inner ring of the respective rolling bearing and said eternal limiting means on said anchored end of said shaft.

14. The roller as in claim 1, said annular bracket being of extruded sheet metal, aluminum alloy, or plastic and being connected to said annular boss, said annular boss being fitted on said shaft.

* * * * *